(12) United States Patent
Hanson et al.

(10) Patent No.: US 7,593,392 B1
(45) Date of Patent: Sep. 22, 2009

(54) METHOD AND APPARATUS FOR PROVIDING ASYNCHRONOUS AUDIO MESSAGING

(75) Inventors: Karrie Hanson, Westfield, NJ (US); Kermit Hal Purdy, Bernardsville, NJ (US); Gerald Karam, Morristown, NJ (US)

(73) Assignee: AT&T Corp., New York, NY (US)

( * ) Notice: Subject to any disclaimer, the term of this patent is extended or adjusted under 35 U.S.C. 154(b) by 475 days.

(21) Appl. No.: 11/049,511

(22) Filed: Feb. 2, 2005

(51) Int. Cl.
*H04L 12/66* (2006.01)

(52) U.S. Cl. .......................... 370/352; 370/296; 379/68

(58) Field of Classification Search ....................... None
See application file for complete search history.

(56) References Cited

U.S. PATENT DOCUMENTS

| | | | | |
|---|---|---|---|---|
| 5,864,545 A * | 1/1999 | Gonikberg et al. | .......... | 370/286 |
| 6,996,414 B2 * | 2/2006 | Vishwanathan et al. | ..... | 455/518 |
| 7,372,826 B2 * | 5/2008 | Dahod et al. | ................ | 370/328 |
| 2002/0025832 A1 * | 2/2002 | Durian et al. | ............... | 455/556 |
| 2002/0137505 A1 * | 9/2002 | Eiche et al. | ................. | 455/425 |
| 2004/0196833 A1 * | 10/2004 | Dahan et al. | ................ | 370/352 |
| 2004/0224678 A1 * | 11/2004 | Dahod et al. | ............ | 455/426.1 |
| 2005/0135333 A1 * | 6/2005 | Rojas | ........................ | 370/352 |
| 2006/0023649 A1 * | 2/2006 | Tillet et al. | ................... | 370/310 |
| 2006/0276213 A1 * | 12/2006 | Gottschalk et al. | .......... | 455/518 |

* cited by examiner

*Primary Examiner*—Phirin Sam

(57) ABSTRACT

The present invention provides audio messaging in a communications network, e.g., a VoIP network. More specifically, the present invention establishes a non-duplex communication link between a first subscriber and a second subscriber. Audio messages are transmitted between the first subscriber and the second subscriber via the non-duplex communication link.

5 Claims, 4 Drawing Sheets

METHOD AND APPARATUS FOR PROVIDING ASYNCHRONOUS AUDIO MESSAGING

The present invention relates generally to communication networks and, more particularly, to an apparatus and method for providing audio messaging in a communications network, e.g., a Voice over Internet Protocol (VoIP) network.

BACKGROUND OF THE INVENTION

In certain instances, it would be useful to converse from one person to another over an extended time period without using a standard full duplex open telephone line. One reason a conversation of this type would be useful is that it may be desirable to prevent one party from accidentally hearing a background conversation of the other party when a speaker phone is used. Another reason a conversation of this type would be desirable is to keep some history of what was spoken if one party cannot be listening at all times. Yet another reason is that it may be desirable to have the ability to temporarily suspend the conversation in order to place a conventional phone call.

Normally, during a conversation, full duplex phone calls are placed. Users who do not want the other party to the conversation to hear background conversations use the muting function on conventional phones, however, a full duplex telephone resource between the two points is still required. Additionally, the conventional full duplex system does not support any history of conversation without recording the entire phone call.

Therefore, a need exists for a method and apparatus for providing audio messaging in a communications network, such as a VoIP network.

SUMMARY OF THE INVENTION

In one embodiment, the present invention provides audio messaging in a communications network, e.g., a VoIP network. More specifically, the present invention establishes a non-duplex communication link between a first subscriber and a second subscriber. Audio messages are transmitted between the first subscriber and the second subscriber via the non-duplex communication link.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
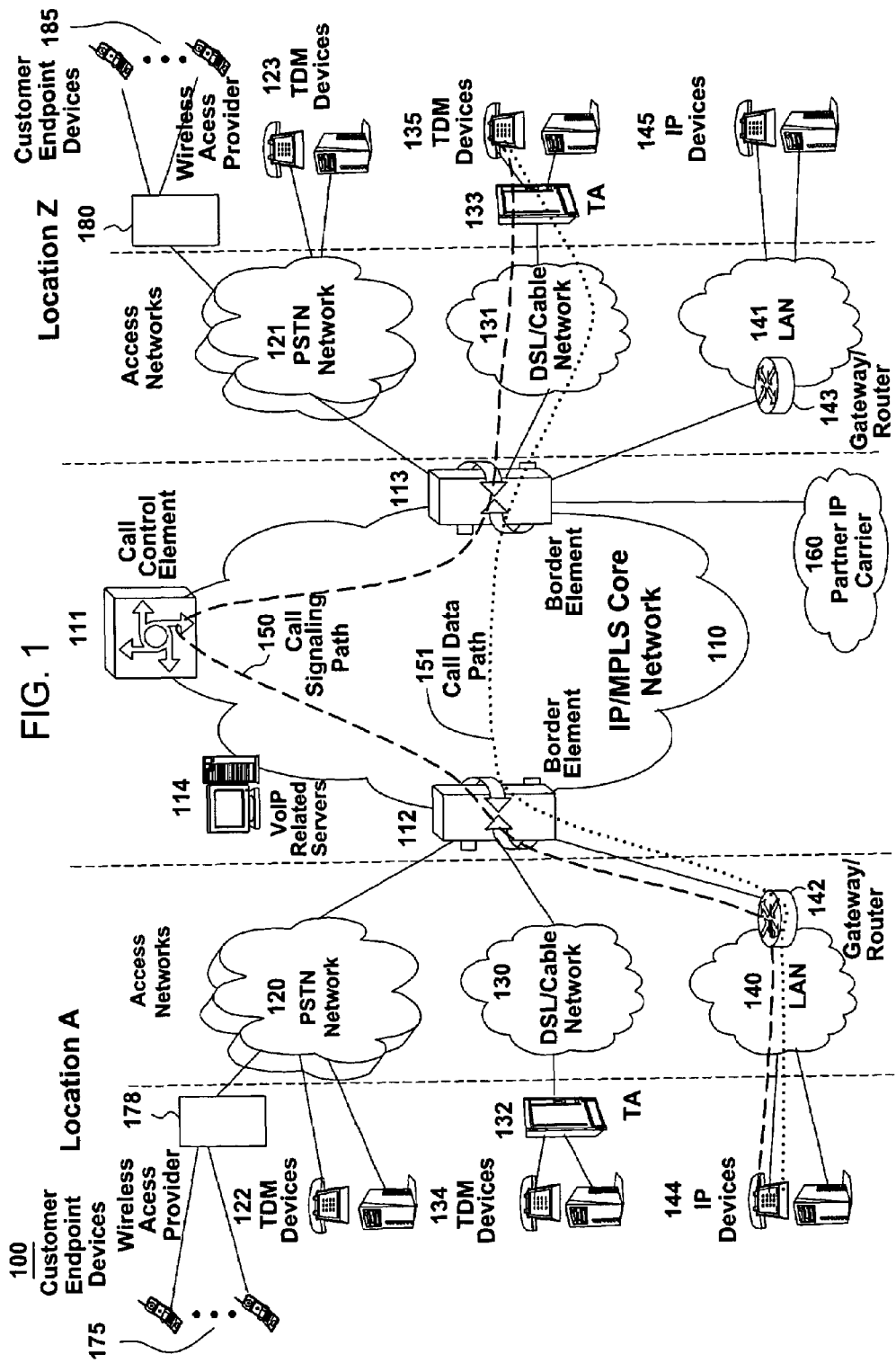
FIG. 1 illustrates a Voice over Internet Protocol (VOIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Although the present invention is described in the context of SIP, It should be understood that the present invention can be employed in any signaling protocols. Furthermore, the present invention can be employed in signaling protocols that are compliant to various signaling standards or their variants.

Normally, during a conversation, full duplex phone calls are placed. Users who do not want the other party to the conversation to hear background conversations use the muting function on conventional phones, however, a full duplex telephone resource between the two points is still required. Additionally, the conventional full duplex system does not support any history of conversation without recording the entire phone call. The present invention provides asynchronous audio messaging using a non-duplex communication link.

Figure 2:
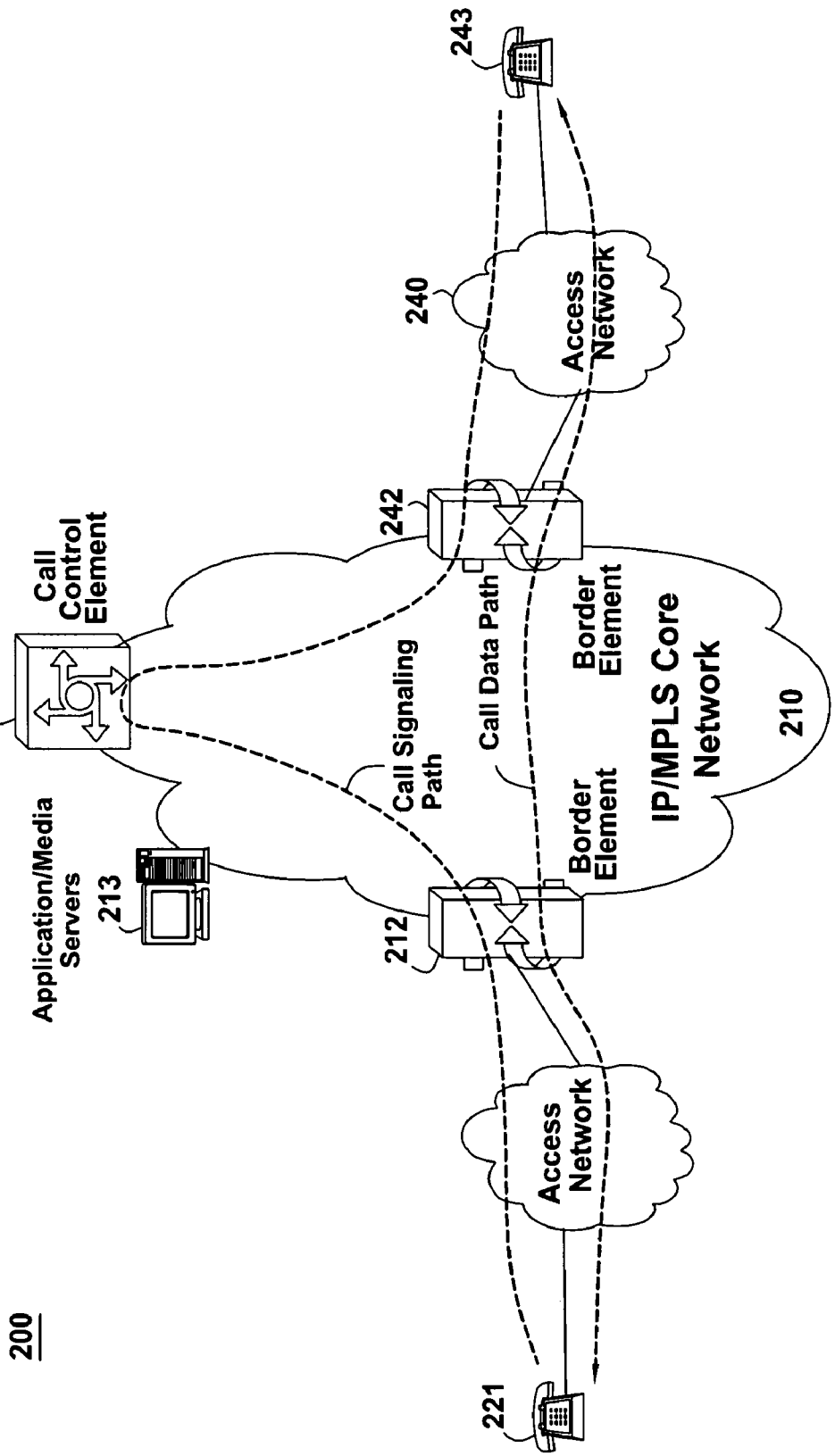
FIG. 2 illustrates an example of a sequence of events related to signal processing by the core VoIP network of the present invention.

FIG. 2 illustrates an example of a sequence of events related to an "open line" feature of the present invention. A first subscriber 221 invokes the service (the "open line" or non-duplex communication link) via access network 220 (e.g., PSTN) to border element 212. The border element 212 sends a service request to call control element 211. Alternatively, the service may alert the second subscriber that an open line is to be established without requiring the first subscriber to record an initial message. Call control element 211 contacts the application/media server 213 to respond to the service request. Once the service has been invoked, the first subscriber records an initial audio message to be delivered to the second subscriber 243. Call control element 211 signals border element 242 to set up the "open line" (e.g., a non-duplex communication link or data path), with the second subscriber 243 via access network 240 (e.g., PSTN). The second subscriber 243 answers their phone and hears the audio message. An open line is now established between the first and second subscribers. Using touch tones, the first subscriber and the second subscriber send audio announcements back and forth to each other. If at any time, either party hangs up the call, the service will automatically attempt to re-establish the open line with the other party by ringing the phone of the party that disconnected, when an audio message is sent. At any time, an incoming call can alert a subscriber using conventional call waiting service. From an "open line" menu, a subscriber can opt to place another call (which temporarily suspends the open line), play back previously sent audio messages from the other party, and opt to place a full duplex call to the other party. Through the use of a computer system, such as a web site, it may also be possible to play back audio messages sent by either party, and save them as a recording of the open line, including a transcription of the audio messages in text.

In one embodiment, the service may be launched via the internet. The service may be controlled via a computer. In one embodiment, the service is controlled by using commands from an input/output device, e.g., a keyboard, a mouse, and the like.

Figure 3:
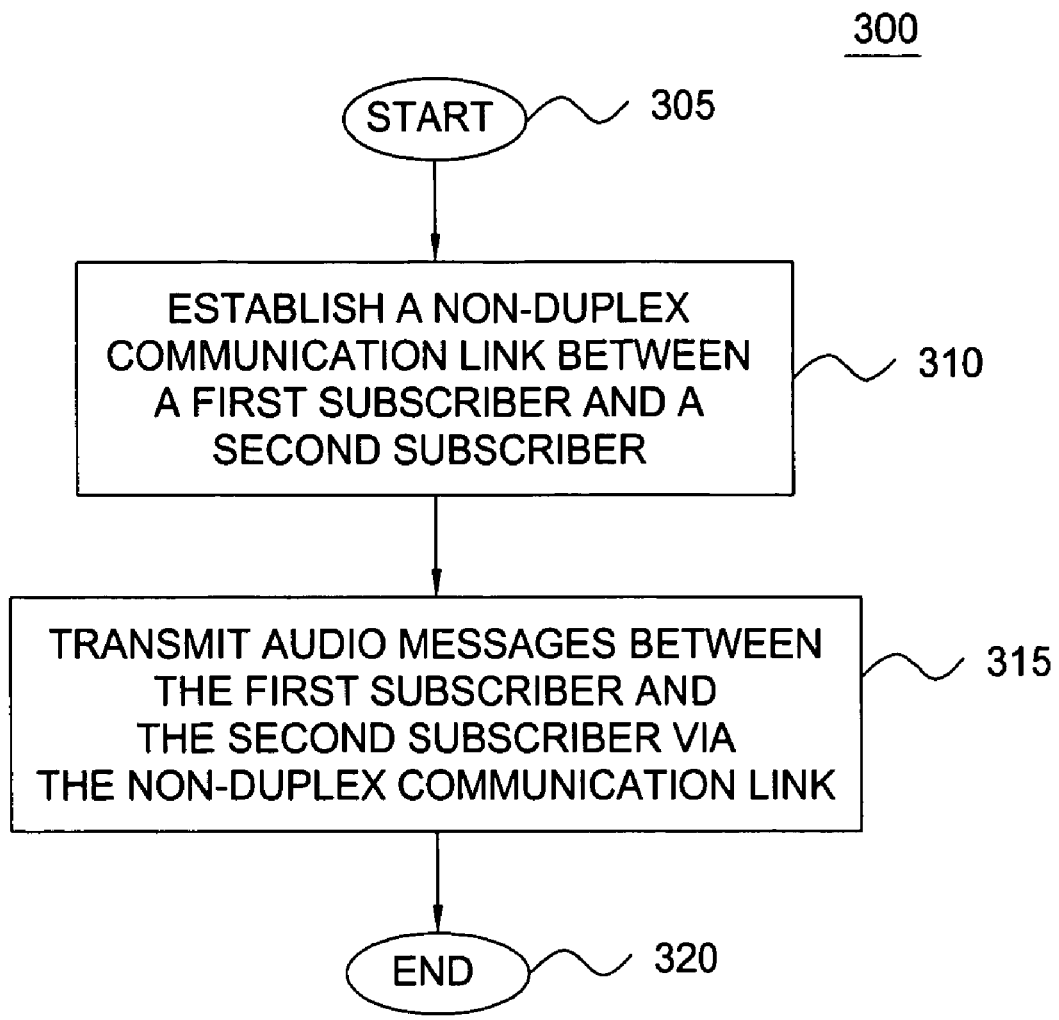
FIG. 3 illustrates a flowchart of a method for providing audio messaging according to one embodiment of the present invention.

FIG. 3 illustrates a flowchart of a method 300 for providing audio messaging according to one embodiment of the present invention. Method 300 starts in step 305 and proceeds to step 310.

In step 310, a non-duplex communication link is established between a first subscriber and a second subscriber. A first subscriber dials a second subscriber as an open line. In one embodiment, the first subscriber presses a touchtone key to talk; and then presses another touchtone key to send. Alternatively, a message is sent after a silence period. The second subscriber's phone rings. The second subscriber is notified of the open line call from the first subscriber, and then hears the message. The line remains open for messaging.

In step 315, audio messages are transmitted between the first subscriber and the second subscriber via the non-duplex communication link. In one embodiment touchtone signals are used to initiate transmission of an audio message. The first or second subscribers can send messages (e.g., by pressing 1 to talk, pressing # to send). If one of the subscribers becomes disconnected, the service attempts to re-establish the open line. At any time, one of the subscribers could press a predetermined touchtone key (e.g., 2) to convert to a regular full duplex call. Again, at any time, one of the subscribers could press a predetermined touchtone key (e.g., 3) to place a call to another party while leaving the line open. When the regular full duplex call is over, the open line is resumed. Any outstanding messages that were received during the call are then played back. At any time, a subscriber could press a predetermined key (e.g., 4) to replay the last message, and press another touchtone key (e.g., 5) to scroll back over previous audio messages, and press a touchtone key (e.g., 6) to scroll forward to previous audio messages.

In one embodiment, a subscriber using the present invention may go to a web site to view the series of audio messages sent by both parties and play them back or save them. If a call comes in to a subscriber, it would be handled by conventional call waiting methods.

Figure 4:
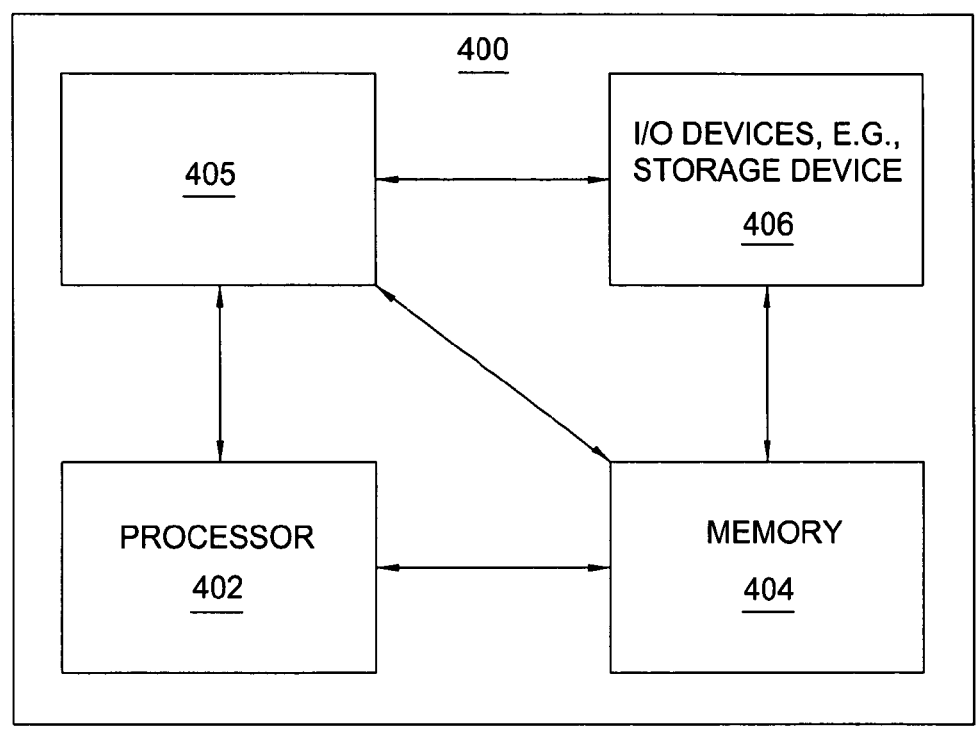
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 300 comprises a processor element 402 (e.g., a CPU), a memory 404, e.g., random access memory (RAM) and/or read only memory (ROM), call setup message monitoring module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present call setup message monitoring module 405 can be loaded into memory 404 and executed by processor 402 to implement the functions as discussed above. As such, the present single number to multiple devices process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing audio messaging, comprising:
   establishing a non-duplex communication link between a first subscriber and a second subscriber, wherein said non-duplex communication link is an open line between said first subscriber and said second subscriber; and
   transmitting recorded audio messages between the first subscriber and the second subscriber via the non-duplex communication link, wherein an automatic attempt is made to re-establish the non-duplex communication link when one party becomes disconnected.

2. A method for providing audio messaging, comprising:
   establishing a non-duplex communication link between a first subscriber and a second subscriber, wherein said non-duplex communication link is an open line between said first subscriber and said second subscriber; and
   transmitting recorded audio messages between the first subscriber and the second subscriber via the non-duplex communication link, wherein, in response to an input from one of said first subscriber or said second subscriber, the non-duplex communication link is temporarily suspended while the one of said first subscriber or said second subscriber initiates another call.

3. An apparatus for providing audio messaging, comprising:
   means for establishing a non-duplex communication link between a first subscriber and a second subscriber, wherein said non-duplex communication link is an open line between said first subscriber and said second subscriber; and
   means for transmitting recorded audio messages between the first subscriber and the second subscriber via the non-duplex communication link, wherein, in response to an input from one of said first subscriber or said second subscriber, the non-duplex communication link is temporarily suspended while the one of said first subscriber or said second subscriber initiates another call.

4. A computer-readable medium having stored thereon a plurality of instructions, the plurality of instructions including instructions which, when executed by a processor, cause the processor to perform the steps of a method for providing audio messaging, comprising:
   establishing a non-duplex communication link between a first subscriber and a second subscriber, wherein said non-duplex communication link is an open line between said first subscriber and said second subscriber; and
   transmitting recorded audio messages between the first subscriber and the second subscriber via the non-duplex communication link, wherein an automatic attempt is made to re-establish the non-duplex communication link when one party becomes disconnected.

5. A computer-readable medium having stored thereon a plurality of instructions, the plurality of instructions including instructions which, when executed by a processor, cause the processor to perform the steps of a method for providing audio messaging, comprising:
   establishing a non-duplex communication link between a first subscriber and a second subscriber, wherein said non-duplex communication link is an open line between said first subscriber and said second subscriber; and
   transmitting recorded audio messages between the first subscriber and the second subscriber via the non-duplex communication link, wherein, in response to an input from one of said first subscriber or said second subscriber, the non-duplex communication link is temporarily suspended while the one of said first subscriber or said second subscriber initiates another call.

* * * * *